US011990097B1

(12) United States Patent
Li et al.

(10) Patent No.: US 11,990,097 B1
(45) Date of Patent: May 21, 2024

(54) DISPLAY DRIVING STRUCTURE, DISPLAY DRIVING METHOD AND DISPLAY DEVICE

(71) Applicant: HKC CORPORATION LIMITED, Shenzhen (CN)

(72) Inventors: Jianlei Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/351,167

(22) Filed: Jul. 12, 2023

(30) Foreign Application Priority Data

Jan. 28, 2023 (CN) ......................... 202310042518.0

(51) Int. Cl.
*G09G 3/3266* (2016.01)
*G09G 3/3275* (2016.01)
*G09G 3/36* (2006.01)

(52) U.S. Cl.
CPC ......... *G09G 3/3266* (2013.01); *G09G 3/3275* (2013.01); *G09G 3/3614* (2013.01); *G09G 3/3677* (2013.01); *G09G 3/3688* (2013.01); *G09G 2310/0254* (2013.01); *G09G 2310/08* (2013.01); *G09G 2330/04* (2013.01)

(58) Field of Classification Search
CPC .. G09G 3/3266; G09G 3/3275; G09G 3/3614; G09G 3/3677; G09G 3/3688; G09G 2310/0254; G09G 2310/08; G09G 2330/04
See application file for complete search history.

(56) References Cited

U.S. PATENT DOCUMENTS

| | | | | |
|---|---|---|---|---|
| 2002/0033440 A1* | 3/2002 | Morita | G09G 3/3688 | 250/208.1 |
| 2003/0090450 A1 | 5/2003 | Inada et al. | | |
| 2008/0246720 A1* | 10/2008 | Lee | G09G 3/3614 | 345/96 |
| 2008/0266284 A1 | 10/2008 | Shie | | |
| 2019/0156725 A1* | 5/2019 | Hsu | G09G 3/2003 | |

FOREIGN PATENT DOCUMENTS

| | | |
|---|---|---|
| CN | 104933997 | 9/2015 |
| CN | 113409718 | 9/2021 |
| CN | 115631725 | 1/2023 |

OTHER PUBLICATIONS

CNIPA, First Office Action for CN Application No. 202310042518.0, dated May 7, 2023.

* cited by examiner

*Primary Examiner* — Abhishek Sarma
(74) *Attorney, Agent, or Firm* — Hodgson Russ LLP

(57) ABSTRACT

A display driving structure includes a drive component and at least a switching component. The drive component is connected to data lines in pixel groups to provide a one-to-one corresponding data signal to each of the sub-pixels through the data lines. A first input terminal of the switching component is configured to receive a p-th row of scanning signals, a second input terminal is configured to receive a (p+1)-th row of scanning signals, a first output terminal is connected to a p-th row of the scan lines in the pixel group, a second output terminal is connected to a (p+1)-th row of the scan lines in the pixel group, and a control terminal is configured to control the conduction sequence of signals in the switching component according to the polarities of the data signals received by adjacent two sub-pixels connected to each column of the data lines.

18 Claims, 10 Drawing Sheets

DISPLAY DRIVING STRUCTURE, DISPLAY DRIVING METHOD AND DISPLAY DEVICE

CROSS-REFERENCE TO RELATED APPLICATIONS

This application claims priority to Chinese Patent Application No. 202310042518.0, filed Jan. 28, 2023, the entire disclosure of which is incorporated herein by reference.

TECHNICAL FIELD

The present application relates to the technical field of display driving, and more specifically, to a display driving structure, a display driving method and a display device.

BACKGROUND ART

Pixel units arrayed in a matrix mode are provided in a display panel, data lines provide grayscale voltages to the pixel units for normal display of the pixel units, and scan lines are configured to provide scanning signals to control the opening or closing of the corresponding pixel units. The grayscale voltages provided by the data lines are switched between high and low grayscale voltages according to the brightness of display screens, and there is a parasitic capacitor on the data line; the switching between the high and low grayscale voltages will lead to a large voltage span for the charge and discharge of the parasitic capacitor, which further leads to an increase in an operating current of a driving chip that provides data signals to the data lines; and the increase in the current of the driving chip will produce unsafe factors.

SUMMARY

There are provided a display driving structure, a display driving method and a display device. The technical solution is as below:

According to a first aspect of the present application, there is provided a display driving structure configured to drive a display panel.

The display panel comprising at least one pixel group, and the pixel group comprises N rows and M columns of sub-pixels, N scan lines and M data lines. An m-th column of the sub-pixels in the pixel group is all connected to an m-th data line, and at least part of the sub-pixels in an n-th row in the pixel group are connected to an n-th scan line, where 1≤n≤N, 1≤m≤M, and N≥3.

The display driving structure comprises a drive component and at least one switching component. The drive component is connected to the data lines in the pixel group, and provides a one-to-one corresponding data signal to each of the sub-pixels through the data lines. The switching component is in one-to-one correspondence with the pixel group, and has a control terminal, a first input terminal, a second input terminal, a first output terminal and a second output terminal. The first input terminal is configured to receive a p-th row of scanning signals, the second input terminal is configured to receive a (p+1)-th row of scanning signals, the (p+1)-th row of the scanning signals is output after the p-th row of the scanning signals, the first output terminal is connected to a p-th row of the scan lines in the pixel group, and the second output terminal is connected to a (p+1)-th row of the scan lines in the pixel group, where 1≤p <N.

The control terminal of the switching component is configured to control conduction of the first input terminal and the second output terminal, and control conduction of the second input terminal and the first output terminal when the data signals received by adjacent two sub-pixels connected to each column of the data lines are different in polarity. The write time of the data signal of the sub-pixel connected to the (p+1)-th row of the scan lines is prior to that of the data signal of the sub-pixel connected to the p-th row of the scan lines.

The control terminal of the switching component is further configured to control conduction of the first input terminal and the first output terminal, and control conduction of the second input terminal and the second output terminal when the data signals received by adjacent two sub-pixels connected to each column of the data lines are same in polarity. The write time of the data signal of the sub-pixel connected to the p-th row of the scan lines is prior to that of the data signal of the sub-pixel connected to the (p+1)-th row of the scan lines.

According to a second aspect of the present disclosure, there is provided a display driving method applied to the display driving structure above.

The display driving structure is configured to drive a display panel. The display panel comprising at least one pixel group, and the pixel group comprises N rows and M columns of sub-pixels, N scan lines and M data lines. An m-th column of the sub-pixels in the pixel group is all connected to an m-th data line, and at least part of the sub-pixels in an n-th row in the pixel group is connected to an n-th scan line, where 1≤n≤N, 1≤m≤M, and N≥3.

The display driving structure comprises a drive component and at least one switching component. The drive component is connected to the data lines in the pixel group to provide a one-to-one corresponding data signal to each of the sub-pixels through the data lines. The switching component is in one-to-one correspondence with the pixel group, and has a control terminal, a first input terminal, a second input terminal, a first output terminal and a second output terminal. The first input terminal is configured to receive a p-th row of scanning signals, the second input terminal is configured to receive a (p+1)-th row of scanning signals, the (p+1)-th row of the scanning signals is output after the p-th row of the scanning signals, the first output terminal is connected to a p-th row of the scan lines in the pixel group, and the second output terminal is connected to a (p+1)-th row of the scan lines in the pixel group, where 1≤p<N.

The display driving method comprises:

acquiring a polarity reversal situation of data signals on the data lines in a same column, generating a switching instruction when the data signals received by adjacent two sub-pixels connected to each column of the data lines are different in polarity, and generating a maintenance instruction when the data signals received by adjacent two sub-pixels connected to each column of the data lines are same in polarity;

according to the switching instruction, controlling conduction of the first input terminal and the second output terminal and controlling conduction of the second input terminal and the first output terminal, at this time, a write time of the data signal of the sub-pixel connected to the (p+1)-th row of the scan lines is prior to that of the data signal of the sub-pixel connected to the p-th row of the scan lines; and according to the maintenance instruction, controlling conduction of the first input terminal and the first output terminal, and controlling conduction of the second input terminal and the second output terminal when the data signals received by adjacent two sub-pixels connected to each column of the data lines are same in polarity, wherein the write time of the data signal of the sub-pixel connected to the p-th row of the scan lines is prior to that of the data signal of the sub-pixel connected to the (p+1)-th row of the scan lines.

According to a third aspect of the present disclosure, there is provided a display device, including a display panel and the display driving structure above, and the display driving structure is configured to drive the display panel.

BRIEF DESCRIPTION OF THE DRAWINGS

The above and other features of the present application will become more apparent by describing exemplary embodiments thereof in detail with reference to the drawings.

DETAILED DESCRIPTION OF THE EMBODIMENTS

Figure 1:
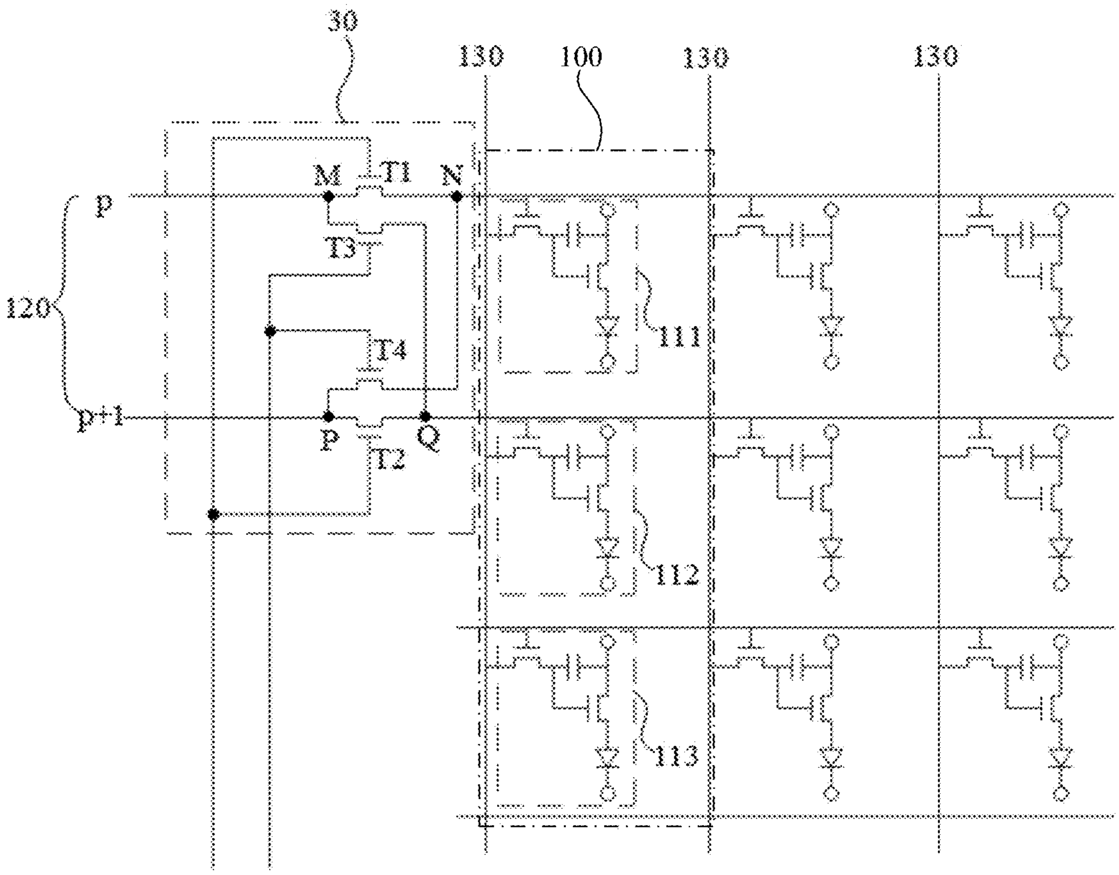
FIG. 1 is a circuit schematic diagram of a display driving structure in a first embodiment of the present application.

Although the present application can be embodied in different forms of embodiments readily, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined together to illustrate a possible system design, these features may further be used for other unspecified combinations. Therefore, unless otherwise stated, the illustrated combinations are not intended to be limiting.

In the embodiments illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the elements changes, the indications of the directions change accordingly.

The exemplary embodiments will now be described more fully with reference to the drawings. However, the exemplary embodiments can be implemented in a variety of forms and should not be construed as being limited to the examples set forth herein; rather, these embodiments are provided so that the present application will be more comprehensive and complete, and the concept of example embodiments will be fully communicated to those skilled in the art. The accompanying drawings are only schematic illustrations of the present application and are not necessarily drawn to scale. Like reference numerals in the figures denote identical or similar parts and thus repetitive descriptions thereof will be omitted.

Preferred embodiments of the present application will be further elaborated below in conjunction with the drawings of the description.

Embodiment 1

Figure 2:
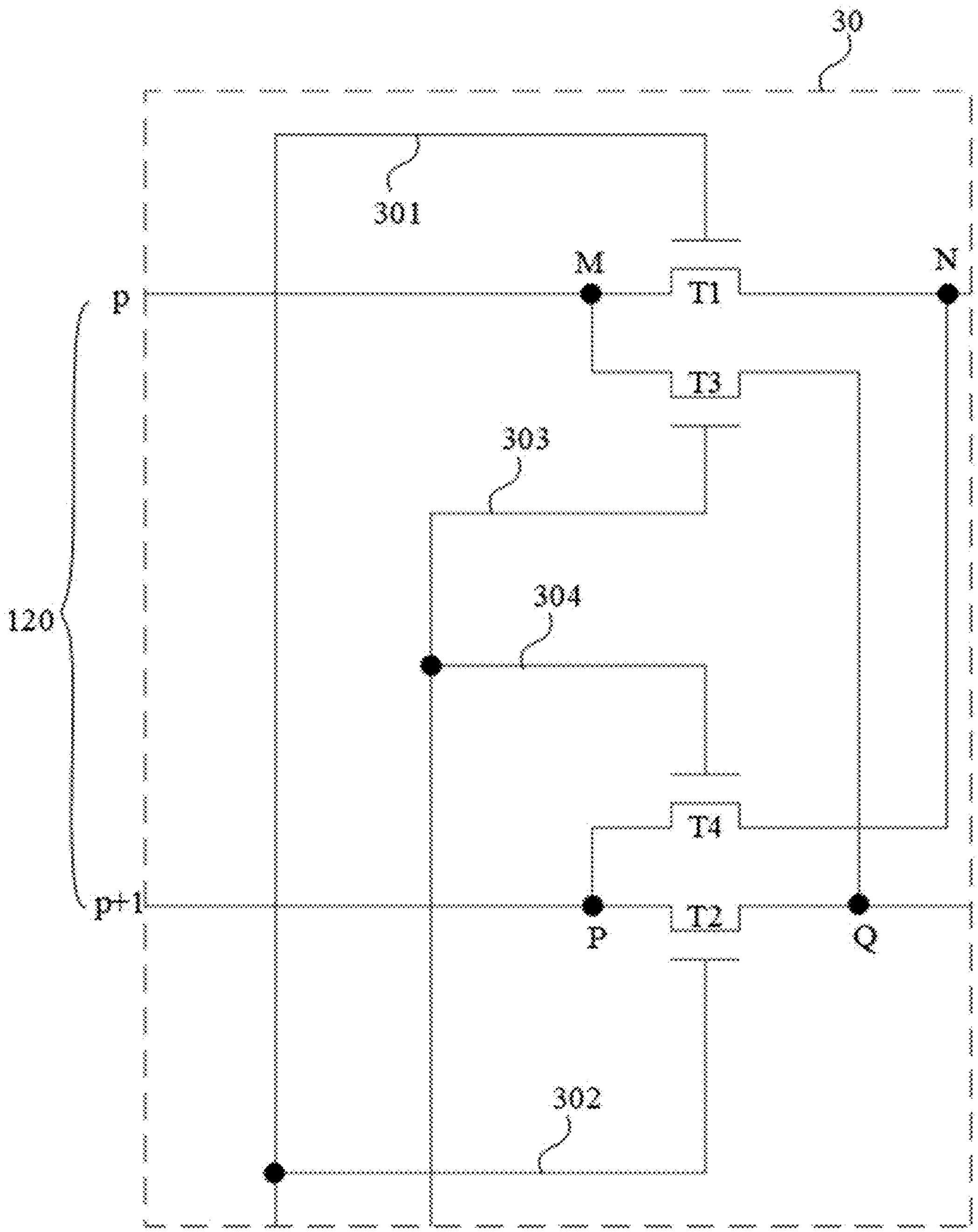
FIG. 2 is an enlarged structural schematic diagram of the display driving structure in FIG. 1 of the present application.
Figure 9:
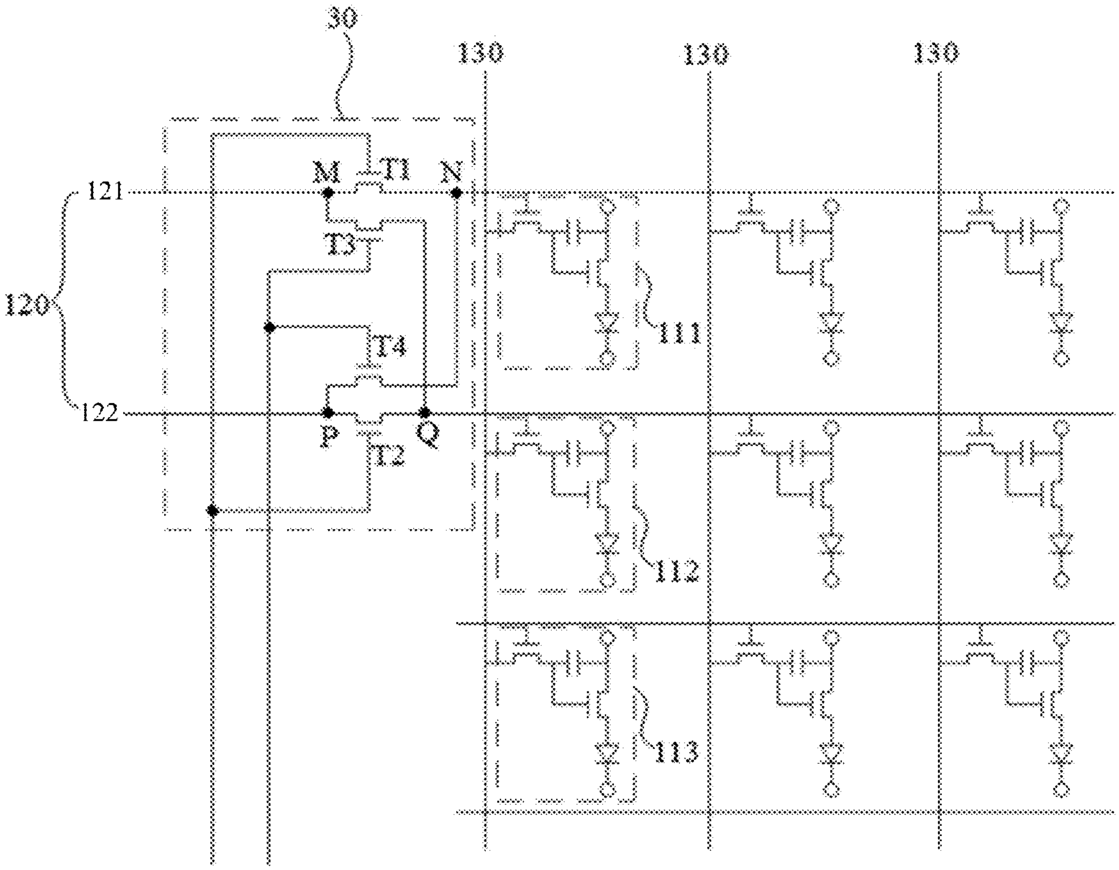
FIG. 9 is a circuit schematic diagram of a display driving structure in a third embodiment of the present application.

Referring to FIGS. 1, 2, and 9, the present application discloses a display driving structure. The technical solution of the present application may be applied to a display panel of a light-emitting diode (LED) or an organic light-emitting diode (OLED), and also may be applied to an LCD (Liquid Crystal Display) panel.

The display driving structure is configured to drive a display panel. The display panel includes at least one pixel group 100, and the pixel group 100 includes a plurality of sub-pixels 110. The plurality of sub-pixels 110 are generally arrayed in a matrix mode, for example, to constitute a N*M sub-pixel 110 matrix including M columns and N rows, where M and N are positive integers greater than zero. The pixel group 100 further includes N scan lines 120 and M data lines 130. An m-th column of the sub-pixels 110 in the pixel group 100 is all connected to an m-th data line 130, and at least part of the sub-pixels 110 in an n-th row in the pixel group 100 are connected to an n-th scan line 120, where $1 \le n \le N$, $1 \le m \le M$, and $N \ge 3$, and n and m are also positive integers. In this embodiment, there are at least three sub-pixels 110 in a same column in the pixel group 100.

The display driving structure includes a drive component 20. The drive component 20 is connected to the data lines 130 in the pixel group 100 to provide a one-to-one corresponding data signal to each of the sub-pixels 110 through the data lines 130. There are a plurality of data signals provided by the data lines 130, such as a high grayscale voltage, a low grayscale voltage, a high grayscale voltage, etc. One sub-pixel 110 correspondingly receives a data signal, that is, one sub-pixel 110 receives a grayscale voltage, and the sub-pixels 110 perform different brightness displays based on the data signals. Generally, if the grayscale voltage in the data signal is high, the brightness of the sub-pixel 110 becomes high. If the grayscale voltage is low, the sub-pixel 110 is less bright.

The drive component 20 may be understood as a driving chip. When the drive component 20 provides data signals, and the data signals undergo reversed switching between high grayscale voltages and low grayscale voltages, a load current of the drive component 20 may increase. If the load current is high for a long time, the service life of the drive component 20 is easy to be reduced or even burned out.

The display driving structure further includes at least one switching component 30 which is in one-to-one correspondence with the pixel group 100, and one switching component 30 is configured to control switching of the data signals in one pixel group 100. The switching component 30 has a control terminal, a first input terminal M, a second input terminal P, a first output terminal N and a second output terminal Q. The first input terminal M is configured to receive a p-th row of scanning signals, the second input terminal P is configured to receive a (p+1)-th row of scanning signals. The (p+1)-th row of the scanning signals is output after the p-th row of the scanning signals. The first output terminal N is connected to a p-th row of the scan lines in the pixel group 100, the second output terminal Q is connected to a (p+1)-th row of the scan lines in the pixel group 100, where 1≤p<N, and p is a positive integer.

The sub-pixels are correspondingly connected to a row of scan lines. For example, a first row of the sub-pixels is correspondingly connected to a first row of the scan liens, and a second row of the sub-pixel is correspondingly connected to a second row of the scan liens. Alternatively, the first row of the sub-pixel is correspondingly connected to the second row of the scan liens, and the second row of the sub-pixels is correspondingly connected to a third row of the scan liens. In short, one sub-pixel is connected to a row of the scan lines, that is, the sub-pixels in a same row may be connected to a same row of the scan lines, or the sub-pixels in a same row may be connected to the scan lines in different rows.

Write objects of the p-th row of the scanning signals and the (p+1)-row of the scanning signals may be exchanged by means of the switching component 30. The switching component 30 has two operating modes. In a first operating mode, the first input terminal M and the first output terminal N are conducted, and the second input terminal P and the second output terminal Q are conducted. In a second operating mode, the first input terminal M and the second output terminal Q are conducted, and the second input terminal P and the first output terminal N are conducted. The switching component 30 may be switched between the first operating mode and the second operating mode.

The control terminal of the switching component 30 is configured to control conduction between the first input terminal M and the second output terminal Q, and control conduction between the second input terminal P and the first output terminal N when the data signals received by adjacent two sub-pixels 110 connected to each column of the data lines 130 are different in polarity. At the moment, the switching component 30 is switched to the second operating mode. And in the meantime, a write time of the data signal of the sub-pixel 110 connected to the (p+1)-th row of the scan lines is prior to that of the data signal of the sub-pixel 110 connected to the p-th row of the scan lines. The p-th row of the scanning signals and the (p+1)-th row of the scanning signals are input normally, and by means of the switching component 30, the (p+1)-th row of the scanning signals are input into the p-th row of the scan lines and the p-th row of the scanning signals are input into the (p+1)-th row of the scan lines. Synchronously, an input sequence of the grayscale voltages on the data signals is transposed. In such a way, the reversal of two adjacent data signals on the data line 130 is transposed, but the input sequence of corresponding scanning signals is also transposed, which reduces the number of reversals of the data signals on the data lines 130 on the condition that the display brightness of the corresponding sub-pixel 110 remains unchanged. Only a charging sequence of the front and back sub-pixels 110 is changed.

It should be noted that, the polarity difference of the data signals can be interpreted as a polarity difference of positive and negative voltages, as well as a level difference of grayscale voltages. For example, when the display driving structure is applied in a display panel of an OLED, the grayscale voltages in the data signals are 10V and 0V; when the grayscale voltage is 10V, the OLED is completely turned on, and when the grayscale voltage is 0V, the OLED is completely turned off, so 10V and 0V may be interpreted as that the data signals are different in the polarity. For another example, when the display driving structure is applied in a panel of an LCD, the grayscale voltages in the data signals are 10V and −10V, the rotation of liquid crystal molecules in the panel of the LCD is driven at the grayscale voltages of 10V and −10V, 10V corresponds to a time of highest brightness, −10V also corresponds to the time of highest brightness, and through positive and negative switching of the voltages, the solidification of the liquid crystal molecules is avoided, so 10V and −10V may also be interpreted as that the data signals are different in the polarity.

For example, the switching sequence of the grayscale voltages of the data signals on the data line 130 is high, low and high grayscale voltages, these three grayscale voltages are transmitted successively. The voltage outputted by the drive component 20 should be switched twice between high and low voltages. At this time, the switching component 30 is switched from the first operating mode to the second operating mode, and an opening sequence of two adjacent scan lines 120 is changed. An output sequence of the grayscale voltages on the corresponding data line 130 is also changed. Then the sequence of the greyscale voltages on the data line 130 is low, high and high greyscale voltages. Two high grayscale voltages are continuously outputted without being switched therebetween, thus, the data signals on the data line 130 only need a voltage switch, so that the number of reversals can be reduced.

The control terminal of the switching component 30 is further configured to control conduction between the first input terminal M and the first output terminal N, and to control conduction between the second input terminal P and the second output terminal Q when the data signals received by adjacent two sub-pixels 110 connected to each column of the data lines 130 are same in polarity. And in the meantime, the write time of the data signal of the sub-pixel 110 connected to the p-th row of the scan lines is prior to that of the data signal of the sub-pixel 110 connected to the (p+1)-th row of the scan lines. At this time, the polarities are the same, the switching of high and low voltages on the data line 130 is less, the load current is low, and the current operating mode of the switching component 30 is maintained.

In the technical solution of the present application, when the data signals on the data line 130 are reversed, two adjacent data signals may be different in polarity. At this time, the switching component 30 controls conduction between the first input terminal M and the second output terminal Q and controls conduction between the second input terminal P and the first output terminal N so as to transmit the p-th row of scanning signals to the (p+1)-th row of the scan lines and transmit the (p+1)-th row of scanning signals to the p-th row of the scan lines. At this time, a write time of the data signal of the sub-pixel 110 connected to the (p+1)-th row of the scan lines is prior to that of the data signal of the sub-pixel 110 connected to the p-th row of the scan lines. Therefore, the before-after reversed polarities of two adjacent data signals on the data line 130 may be changed, thus reducing the polarity switching frequency of the data signals, and then the load current of the drive component 20 is reduced, that is, an operating current of a driving chip is reduced, thereby improving the safety of use.

In addition, it should be pointed out that switching from the first operating mode to the second operating mode may reduce the polarity reversal of the data signals and reduce the load current. Switching from the second operating mode to the first operating mode may also reduce the polarity reversal of the data signals. In other words, in the second operating mode, there are many polarity reversals, and the load current is high. For example, in the second operating mode, the sequence of the grayscale voltages in the data signals is low, high and low grayscale voltages, switching among low, high and low grayscale voltages is performed twice. In the case of being switched to the first operating mode, an input sequence of the scanning signals and the sequence of corresponding data signals are switched again, so that the sequence of voltages in the data signals is switched to high, low and low grayscale voltages, and two low grayscale voltages are continuously outputted without being switched therebetween, therefore, the number of reversals may be reduced.

In addition, the safety may improved by increasing the power of the drive component 20 or arranging a heat sink into the drive component 20, but these methods will lead to an increase in cost, while in the technical solution of the present application, the safety is improved by changing the switching sequence of high and low grayscale voltages, thereby reducing the increase in cost.

As shown in FIG. 2, in order to ensure that the switching component 30 can complete switching successfully, the switching component 30 includes a first response switch T1 and a third response switch T3. An input terminal of the first response switch T1 is connected to the first input terminal M, an output terminal of the first response switch T1 is connected to the first output terminal N, an input terminal of the third response switch T3 is connected to the first input terminal M, and an output terminal of the third response switch T3 is connected to the second output terminal Q.

The switching component 30 includes a second response switch T2 and a fourth response switch T4. An input terminal of the second response switch T2 is connected to the second input terminal P, an output terminal of the second response switch T2 is connected to the second output terminal Q, an input terminal of the fourth response switch T4 is connected to the second input terminal P, and an output terminal of the fourth response switch T4 is connected to the first output terminal N.

A control terminal of the first response switch T1 is connected to a first signal line 301, a control terminal of the second response switch T2 is connected to a second signal line 302, a control terminal of the third response switch T3 is connected to a third signal line 303, and a control terminal of the fourth response switch T4 is connected to a fourth signal line 304. When the load current of the drive component 20 is large, a first response signal is generated, and the first response signal is transmitted to the control terminal of the first response switch T1 through the first signal line 301. Similarly, a second response signal, a third response signal, and a fourth response signal are also generated. The second response signal is transmitted to the second response switch T2 through the second signal line 302, the third response signal is transmitted to the third response switch T3 through the third signal line 303, and the fourth response signal is transmitted to the fourth response switch T4 through the fourth signal line 304. The response switches mentioned above may be type-N or type-P response switches, the type-N response switches respond to high levels and type-P response switches respond to low levels.

For example, the first response switch T1, the second response switch T2, the third response switch T3, and the fourth response switch T4 are all N-type response switches. A production process of the response switches of the same type is simple, so that the operating efficiency is improved. In the first operating mode, the first response signal and the second response signal are high levels, and the third response signal and the fourth response signal are low levels. The first response switch T1 and the second response switch T2 are turned on, the third response switch T3 and the fourth response switch T4 are turned off, and the p-th row of the scanning signals successively pass through the first input terminal M, the first response switch T1 and the first output terminal N to the p-th row of the scan lines. The (p+1)-th row of the scanning signals pass through the second input terminal P, the second response switch T2 and the second output terminal Q successively to the (p+1)-th row of the scan lines.

In the second operating mode, the first response signal and the second response signal are low levels, and the third response signal and the fourth response signal are high levels. The first response switch T1 and the second response switch T2 are turned off, the third response switch T3 and the fourth response switch T4 are turned on, and the p-th row of the scanning signals successively pass through the first input terminal M, the third response switch T3 and the second output terminal Q to the (p+1)-th row of the scan lines. The (p+1)-th row of the scanning signals pass through the second input terminal P, the fourth response switch T4 and the first output terminal N successively to the p-th row of the scan lines.

In order to reduce circuit layout and improve the accuracy of control of the response switches, the first signal line 301 and the second signal line 302 are connected to a same circuit, and the third signal line 303 and the fourth signal line 304 are connected to a same circuit. In other words, the first response switch T1 and the second response switch T2 can be synchronously controlled, and the third response switch T3 and the fourth response switch T4 can be synchronously controlled. The first response signal and the second response signal are the same response signal and the third response signal and the fourth response signal are the same response signal, one of which is a high level, and the other one is a low level.

Figure 4:
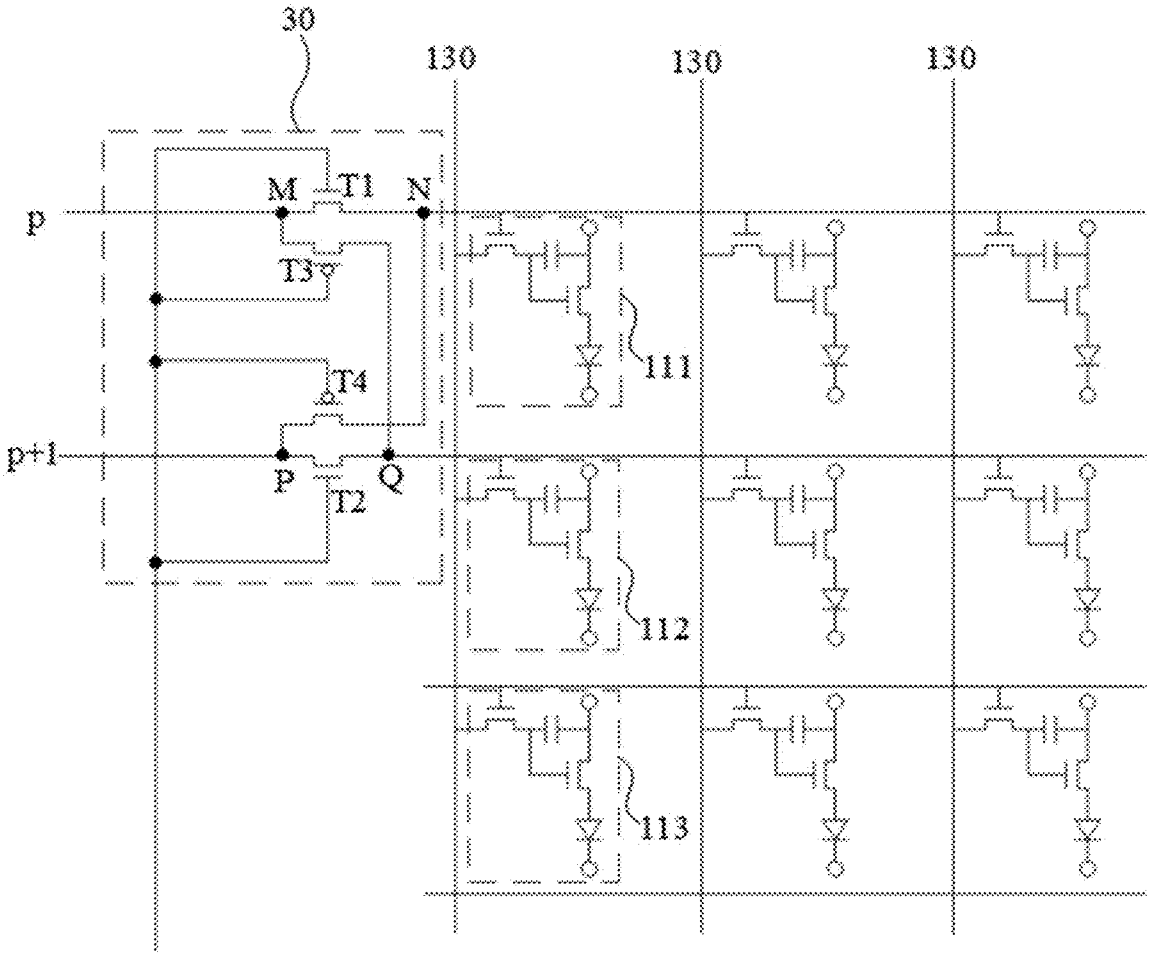
FIG. 4 is a circuit structural schematic diagram of the display driving structure that only has a signal line in the present application.

As shown in FIG. 4, in addition, the first response switch T1 and the second response switch T2 are response switches of the same type, and the third response switch T3 and the fourth response switch T4 are response switches of the same type, and the first response switch T1 and the third response switch T3 are of different types. For example, the first response switch T1 and the second response switch T2 are type-N switches, and the third response switch T3 and the fourth response switch T4 are type-P switches. The first signal line, the second signal line, the third signal line, and the fourth signal line are connected to a same circuit. In the first operating mode, when high levels are provided to the first signal line, the second signal line, the third signal line and the fourth signal line, the first response switch T1 and the second response switch T2 are turned on, and the third response switch T3 and the fourth response switch T4 are turned off. In the second operating mode, when low levels are provided to the first signal line, second signal line, third signal line and fourth signal line, the first response switch T1 and the second response switch T2 are turned off, and the third response switch T3 and the fourth response switch T4 are turned on. In such a way, the structure is simple, and the four response switches may be controlled by only one signal line.

Each of the pixel groups 100 includes at least four sub-pixels 110, all of which are connected to a same data line 130; and the p-th row of the scan lines and the (p+1)-th row of the scan lines are scan lines 120 corresponding to any two adjacent sub-pixels 110. Control of the four sub-pixels 110 as a pixel group can not only reduce the switching frequency of high and low grayscale voltages, but also effectively realize the effective control of the whole display panel.

For example, the four sub-pixels 110, from top to bottom, are a first sub-pixel 111, a second sub-pixel 112, a third sub-pixel 113 and a fourth sub-pixel 114 respectively. The p-th row of the scan lines 120 corresponds to the first sub-pixel 111, and the (p+1)-th row of the scan line 120 corresponds to the second sub-pixel 112. In the first operating mode, the switching sequence of the grayscale voltages on the data line 130 is high, low, high and low grayscale voltages, and these four grayscale voltages are transmitted successively, wherein, the voltage outputted by the drive component 20 should be switched between high and low greyscale voltages for at least three times. Three times of switching causes an increase in the load current of the drive component 20. And when the increase in the load current of drive component 20 is detected, the switching component 30 performs a switching operation. When the switching component 30 is switched from the first operating mode to the second operating mode, the opening sequence of the p-th row of the scan lines and the (p+1)-th row of the scan lines that are adjacently arranged is changed. The output sequence of the grayscale voltages on the corresponding data line 130 is also changed. In the second operating mode by switching, the sequence of the greyscale voltages on the data line 130 is low, high, high and low greyscale voltages. Two high grayscale voltages are continuously output without being switched therebetween. According to the solution, a next-frame display screen may be compensated based on a load current of a current display screen, and the data line 130 of the next-frame display screen only needs two voltage switches, thus the load current of drive component 20 may be reduced.

In addition, the p-th row of the scan lines 120 may correspond to the second sub-pixel 112, and the (p+1)-th row of the scan line 120 corresponds to the third sub-pixel 113. It could also be that the p-th row of the scan lines 120 corresponds to the third sub-pixel 113, and the (p+1)-th row of the scan line 120 corresponds to the fourth sub-pixel 114.

Furthermore, the display driving structure includes a power supply component 40, a timing control component 50 and a conversion component 60.

The power supply component 40 is connected to the drive component 20. The power supply component 40 is configured to detect a load current change of the drive component 20, and to feed back a detection result. When the polarities of adjacent data signals on the data line 130 are reversed, the load current of the drive component 20 changes. The power supply component 40 provides a load current to the drive component 20, and when the frequency of switching between high and low grayscale voltages of the drive component 20 is high, the load current consumed by the drive component 20 increases, and then the current provided by the power supply component 40 increases accordingly. The power supply component 40 detects the change of the load current and outputs the detection result to the timing control component 50.

The timing control component 50 is connected to the power supply component 40 and the drive component 20 respectively, and is configured to receive the detection result fed back by the power supply component 40. The timing control component 50 is further configured to adjust the write sequence of the data signal of the sub-pixel 110 connected to the p-th row of the scan lines and the data signal of the sub-pixel 110 connected to the (p+1)-th row of the scan lines according to the detection result. When the load current of the drive component 20 increases, the power supply component 40 detects a current increase and transmits the result of the load current increase to the timing control component 50. The timing control component 50 adjusts the write sequence of the data signal of the sub-pixel 110 connected to the p-th row of the scan lines and the data signal of the sub-pixel 110 connected to the (p+1)-th row of the scan lines in the drive component 20 according to the load current increase of the drive component 20. For example, an original output sequence of high, low, high, and low greyscale voltages is adjusted to a sequence of low, high, high, and low greyscale voltages.

The conversion component 60 is connected to the timing control component 50 and the switching component 30, and is configured to provide a p-th row of scanning signals and a (p+1)-th row of scanning signals. The switching component 30 is further configured to transmit a switching instruction or a maintenance instruction to the control terminal of the switching component 30. The switching component 30 controls conduction between the first input terminal M and the second output terminal Q, and controls conduction between the second input terminal P and the first output terminal N according to the switching instruction. Alternatively, The switching component 30 controls conduction between the first input terminal M and the first output terminal N, and controls conduction between the second input terminal P and the second output terminal Q according to the maintenance instruction.

Further, in order to ensure the adjustment of the output sequence of the grayscale voltages of the data signals in the drive component 20, the timing control component 50 includes a latch element 510. When the polarities of the data signals received by two adjacent sub-pixels 110 are different, the latch element 510 is configured to store the data signals of the sub-pixel 110 connected to the p-th row of the scan lines so as to write the data signal of the sub-pixel 110 connected to the (p+1)-th row of the scan lines first and then write the data signal of the sub-pixel 110 connected to the p-th row of the scan lines. Through a latch function of the latch element 510, the data signal of the sub-pixel 110 connected to the p-th row of the scan lines 120, which has a time point ahead, is saved, and the data signal of the sub-pixel 110 connected to the (p+1)-th row of the scan lines 120, which has a time point behind, is outputted first, and then the data signal of the sub-pixel 110 connected to the p-th row of the scan lines, which is saved by the latch element 510, is released, so that the sequence of the grayscale voltages in the data signals is switched.

Figure 3:
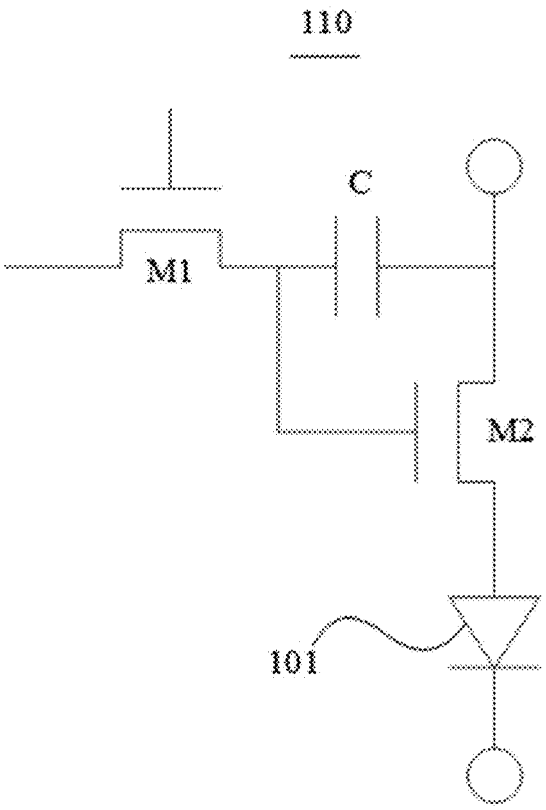
FIG. 3 is a circuit structural schematic diagram of a sub-pixel in FIG. 1 of the present application.

As shown in FIG. 3, when the technical solution of the present application is applied to a display panel of an OLED, the sub-pixel 110 includes a first control switch M1, a second control switch M2 and a storage capacitor C. A control terminal of the first control switch M1 is connected to the scan line 120, a first terminal of the first control switch M1 is connected to the data line 130, a second terminal of the first control switch M1 is connected to a first plate electrode of the storage capacitor C, and a second plate electrode of the storage capacitor C is connected to a power supply terminal. A control terminal of the second control switch M2 is connected to a circuit between the first control switch M1 and the storage capacitor C, a first terminal of the second control switch M2 is connected to a circuit between the storage capacitor C and the power supply terminal, and a second terminal of the second control switch M2 is connected to a light emitting unit 101, that is, the second terminal of the second control switch M2 is connected to the OLED, and a cathode of the OLED is connected to a common GND.

Figure 5:
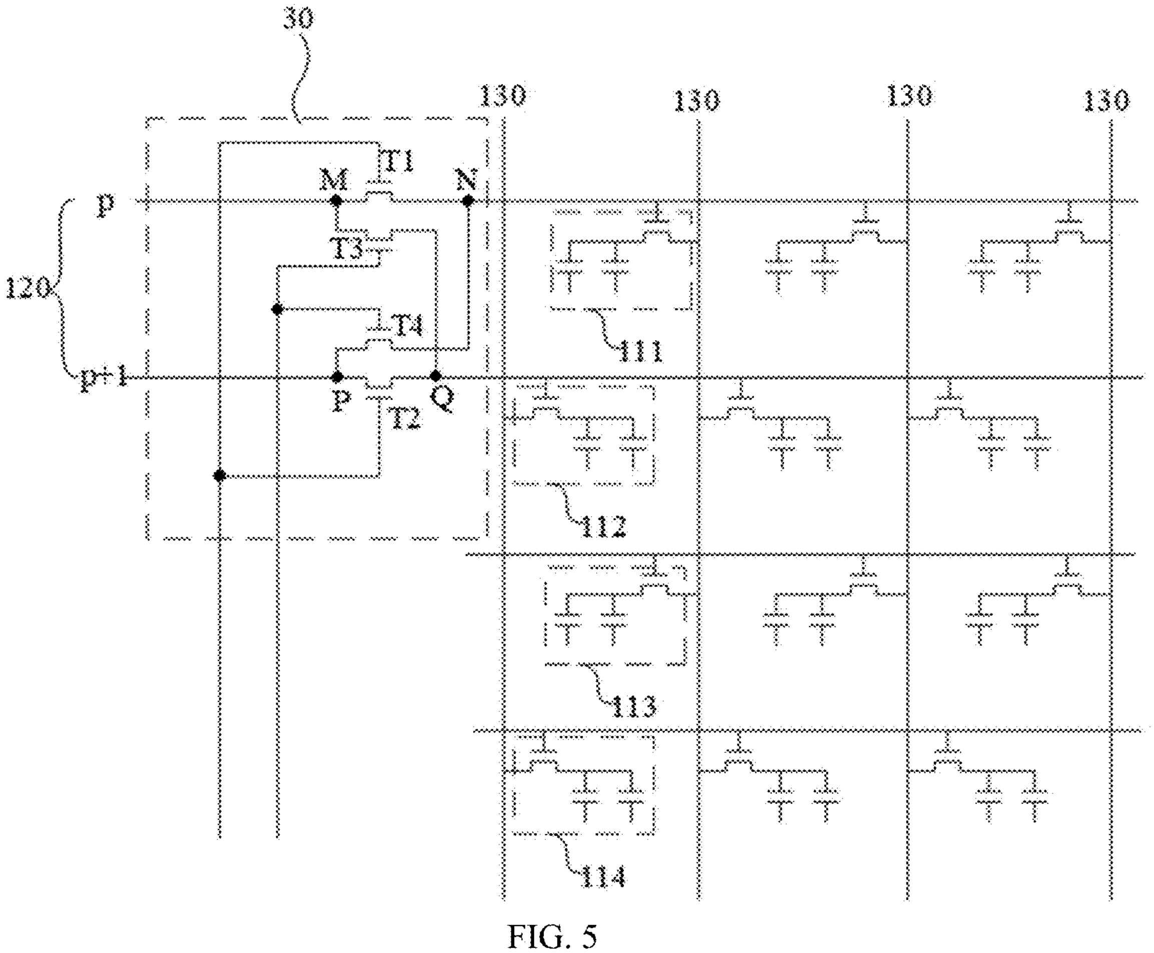
FIG. 5 is a circuit structural schematic diagram of the display driving structure applied to an LCD (liquid crystal display) in the present application.
Figure 6:
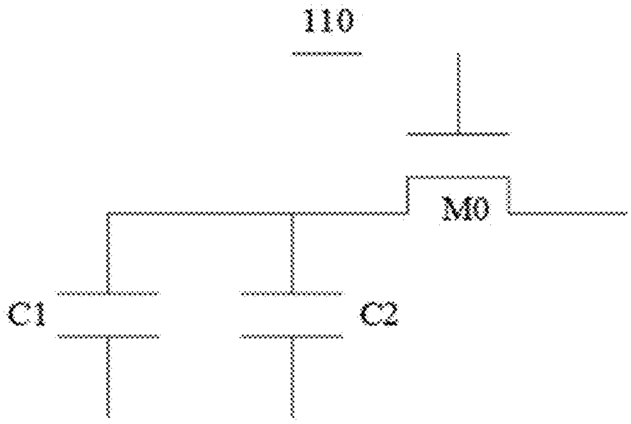
FIG. 6 is a circuit structural schematic diagram of a sub-pixel in FIG. 5 of the present application.

Referring to FIG. 5 and FIG. 6, when the technical solution of the present application is applied to a display panel of an LCD, the sub-pixel 110 includes a drive switch M0, a control terminal of the drive switch M0 is connected to the scan line 120, a first terminal of the drive switch M0 is connected to the data line 130, and a second terminal of the drive switch M0 is connected to a first electrode of a first capacitor C1, and a first electrode of a second capacitor C2 is also connected to the second terminal of the drive switch M0. A second electrode of the first capacitor C1 and a second electrode of the second capacitor C2 are connected to a common GND. The panel of the LCD includes a liquid crystal layer arranged between the first electrode and the second electrode of the first capacitor C1.

Embodiment 2

The present application further provides a display driving method. The display driving method is applied to the display driving structure disclosed in Embodiment 1 and configured to drive a display panel. The display panel including at least one pixel group 100, each pixel group 100 includes N rows and M columns of sub-pixels 110, N scan lines 120 and M data lines 130, an m-th column of the sub-pixels 110 in the pixel group 100 are all connected to an m-th data line 130, and at least part of the sub-pixels 110 of an n-th row in the pixel group 100 are connected to an n-th scan line 120, where $1 \leq n \leq N$, $1 \leq m \leq M$, and $N \geq 3$. The display driving structure includes a drive component 20 and at least one switching component 30. The drive component 20 is connected to the data lines 130 in the pixel group 100 to provide a one-to-one corresponding data signal to each of the sub-pixels 110 through the data lines 130. The switching component 30 is in one-to-one correspondence with the pixel group 100, and the switching component 30 has a control terminal, a first input terminal M, a second input terminal P, a first output terminal N and a second output terminal Q. The first input terminal M is configured to receive a p-th row of scanning signals, the second input terminal P is configured to receive a (p+1)-th row of scanning signals, and the (p+1)-th row of the scanning signals is outputted after the p-th row of the scanning signals, the first output terminal N is connected to a p-th row of the scan lines in the pixel group 100, the second output terminal Q is connected to a (p+1)-th row of the scan lines in the pixel group 100, where $1 \leq p < N$.

Figure 7:
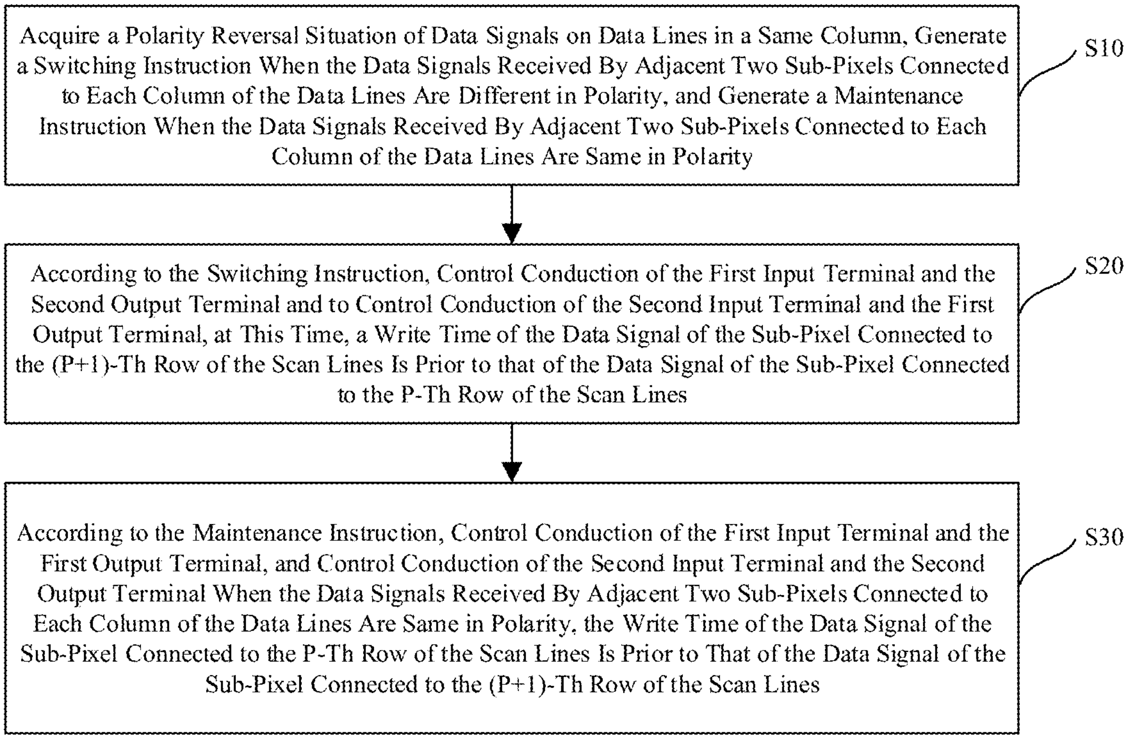
FIG. 7 is a schematic diagram of process steps of a display driving method in a second embodiment of the present application.

As shown in FIG. 7, the display driving method includes:

step S10: a polarity reversal situation of data signals on the data lines in a same column is acquired, a switching instruction is generated when the data signals received by adjacent two sub-pixels connected to each column of the data lines are different in polarity, and a maintenance instruction is generated when the data signals received by adjacent two sub-pixels connected to each column of the data lines are same in polarity. In the reversals of the data signals on the data lines, a sequence of high, low, high and low grayscale voltages may occur, at this time, the load current of the drive component is high and the switching instruction is generated. In the reversals of the data signals on the data lines, a sequence of low, low, low and low grayscale voltages may occur, due to continuous low grayscale voltages, at this time, the load current of the drive component is low, and the maintenance command is generated.

step S20: according to the switching instruction, conduction of the first input terminal and the second output terminal is controlled and conduction of the second input terminal and the first output terminal is controlled, at this time, a write time of the data signal of the sub-pixel connected to the (p+1)-th row of the scan lines is prior to that of the data signal of the sub-pixel connected to the p-th row of the scan lines. The load current of the drive component is high, so the current needs to be lowered to reduce the number of reversals of the grayscale voltages. In the second operating mode, the grayscale voltages of the data signals are low, high, high and low grayscale voltages, which reduces the number of reversals and the load current.

step S30: according to the maintenance instruction, conduction of the first input terminal and the first output terminal is controlled, and conduction of the second input terminal and the second output terminal is controlled when the data signals received by adjacent two sub-pixels connected to each column of the data lines are same in polarity, at this time, the write time of the data signal of the sub-pixel connected to the p-th row of the scan lines is prior to that of the data signal of the sub-pixel connected to the (p+1)-th row of the scan lines. It can also be understood as that, in order to ensure normal write order, the signal with a time point ahead is written first, and the signal with a time point behind is written later.

Figure 8:
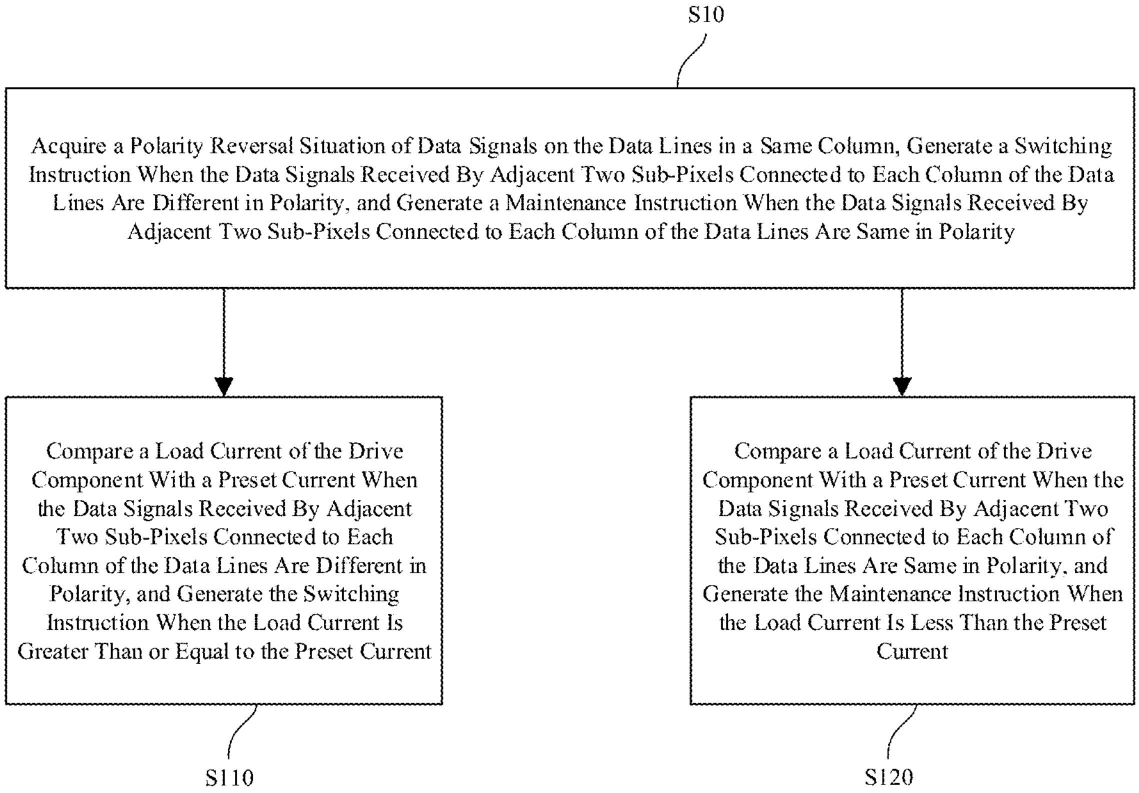
FIG. 8 is a process diagram of step S110 and step S120 of the display driving method in the present application.

As shown in FIG. 8, the step of generating a switching instruction when the data signals received by adjacent two sub-pixels connected to each column of the data lines are different in polarity includes:

step S110: when the data signals received by adjacent two sub-pixels connected to each column of the data lines are different in polarity, a load current of the drive component is compared with a preset current thereof, and when the load current is greater than or equal to the preset current, the switching instruction is generated.

The step of generating a maintenance instruction when the data signals received by adjacent two sub-pixels connected to each column of the data lines are same in polarity includes:

step S120: when the data signals received by adjacent two sub-pixels connected to each column of the data lines are same in polarity, a load current of the drive component is compared with a preset current thereof, and when the load current is less than the preset current, the maintenance instruction is generated.

Therefore, the grayscale voltages on the data line are switched between high grayscale voltages and low grayscale voltages, which will lead to an increase in the load current, the higher the switching frequency is, the greater the load current is. In other words, the load current of the drive component is positively correlated with the high and low switching frequencies of the grayscale voltages on the data line. The switching instruction and the maintenance instruction may be generated by the switching frequency of the grayscale voltages, and also may be generated based on the magnitude of the load current of the drive component.

Embodiment 3

The present application further provides a display driving method. The display driving method is applied to the display driving structure disclosed in Embodiment 1 and configured to drive a display panel. The display driving structure is configured to drive a display panel. The display panel includes a plurality of sub-pixels 110 and a plurality of scan lines 120, the sub-pixels 110 in a same row are connected to a same scan line 120, and the sub-pixels 110 in a same column are connected to a same data line 130.

The display driving structure comprises a drive component 20 and at least one switching components 30. The data lines 130 are connected to the drive component 20, and the drive component 20 is configured to provide data signals and has a first operating mode and a second operating mode. The drive component 20 generates a load current when the data signals are switched between high and low grayscale voltages. As shown in FIG. 9, the plurality of scan lines 120 include a first scan line 121 and a second scan line 122 that are arranged adjacently. A first input terminal M of the switching component 30 is connected to the first scan line 121, a first output terminal N of the switching component 30 is connected to a sub-pixel 110 corresponding to the first scan line 121, a second input terminal P of the switching component 30 is connected to the second scan line 122, and a second output terminal Q of the switching component 30 is connected to a sub-pixel 110 corresponding to the second scan line 122.

The display driving method includes:

detecting a load current change of the drive component and feeding back a detection result;

adjusting a switching sequence between high and low grayscale voltages in the data signal outputted by the drive component according to the detection result, and generating a control instruction;

performing switching between a first operating mode and a second operating mode according to the control instruction;

wherein in the first operating mode, a first scanning signal of the first scan line is transmitted to the first output terminal through the first input terminal, and a second scanning signal of the second scan line is transmitted to the second output terminal through the second input terminal;

wherein in the second operating mode, the first scanning signal is transmitted to the second output terminal through the first input terminal, and the second scanning signal is transmitted to the first output terminal through the second input terminal.

Figure 10:
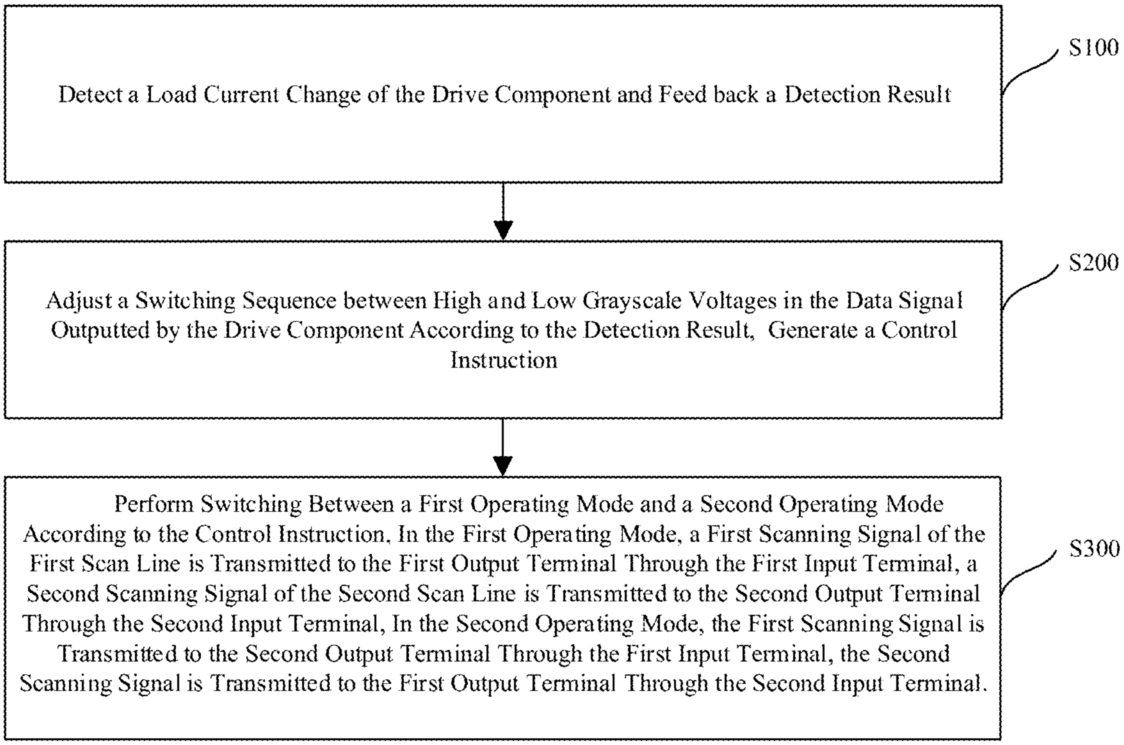
FIG. 10 is a schematic diagram of process steps of a display driving method in a third embodiment of the present application.

Specifically, as shown in FIG. 10, the display driving method includes:

step S100: when the polarities of adjacent data signals on the data line are reversed, a load current of the drive component changes, thus a load current change of the drive component is detected and a detection result is feeded back.

step S200: according to the detection result, the write sequence of the data signal of the sub-pixel 110 connected to the first scan line 121 and the data signal of the sub-pixel 110 connected to the second scan line 121 are adjusted, and a control instruction is generated. For example, in the reversals of the data signals on the data lines, a sequence of high, low, high and low grayscale voltages may occur, at this time, the load current of the drive component is high and the switching instruction is generated. In the reversals of the data signals on the data lines, a sequence of low, low, low and low grayscale voltages may occur, due to continuous low grayscale voltages, at this time, the load current of the drive component is low, and the maintenance command is generated.

step S300: according to the control instruction, the switching component performing switching between a first operating mode and a second operating mode. When in the first operating mode, a first scanning signal of the first scan line is transmitted to the first output terminal through the first input terminal, and a second scanning signal of the second scan line is transmitted to the second output terminal through the second input terminal. When in the second operating mode, the first scanning signal is transmitted to the second output terminal through the first input terminal, and the second scanning signal is transmitted to the first output terminal through the second input terminal.

The control instruction includes a switching instruction and a maintenance instruction, and wherein the step of generating a control instruction includes:

comparing a load current of the drive component with a preset current, and determining a magnitude relationship between the load current and the preset current;

generating the switching instruction when the load current is greater than or equal to the preset current, and controlling the switching component to switch between the first operating mode and the second operating mode according to the switching instruction; and generating the maintenance instruction when the load current is less than the preset current, and maintaining the switching component in the current operating mode according to the maintenance instruction.

Figure 11:
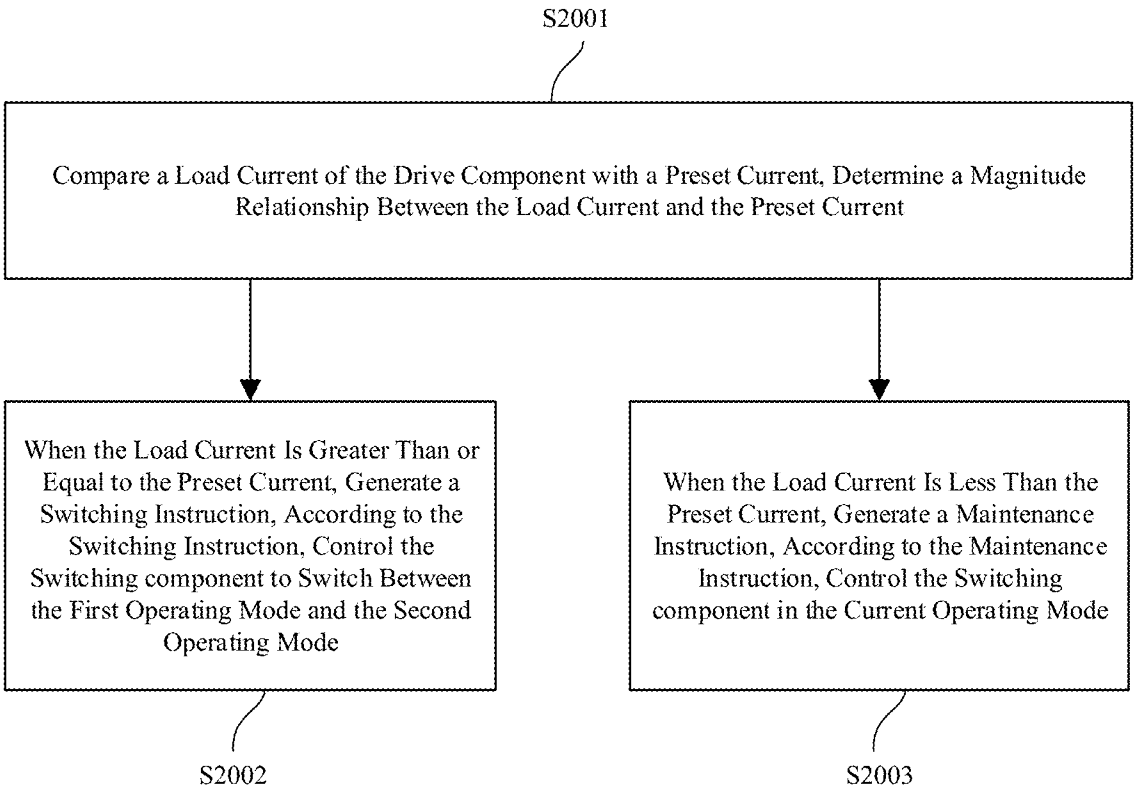
FIG. 11 is a process diagram of step S200 of the display driving method in the present application.

Specifically, as shown in FIG. 11, the step of generating a control instruction includes:

step S2001: a load current of the drive component is compared with a preset current thereof, and a magnitude relationship between the load current and the preset current is determined;

step S2002: when the load current is greater than or equal to the preset current, the switching instruction is generated. According to the switching instruction, the switch of the switching component between the first operating mode and the second operating mode is controlled; and step S2003: when the load current is less than the preset current, the maintenance instruction is generated. according to the maintenance instruction, the current operating mode of the switching component is maintained.

Therefore, the load current of the drive component is positively correlated with the high and low switching frequencies of the grayscale voltages on the data line. The switching instruction and the maintenance instruction may be generated by the switching frequency of the grayscale voltages, and also may be generated based on the magnitude of the load current of the drive component.

Embodiment 4

Figure 12:
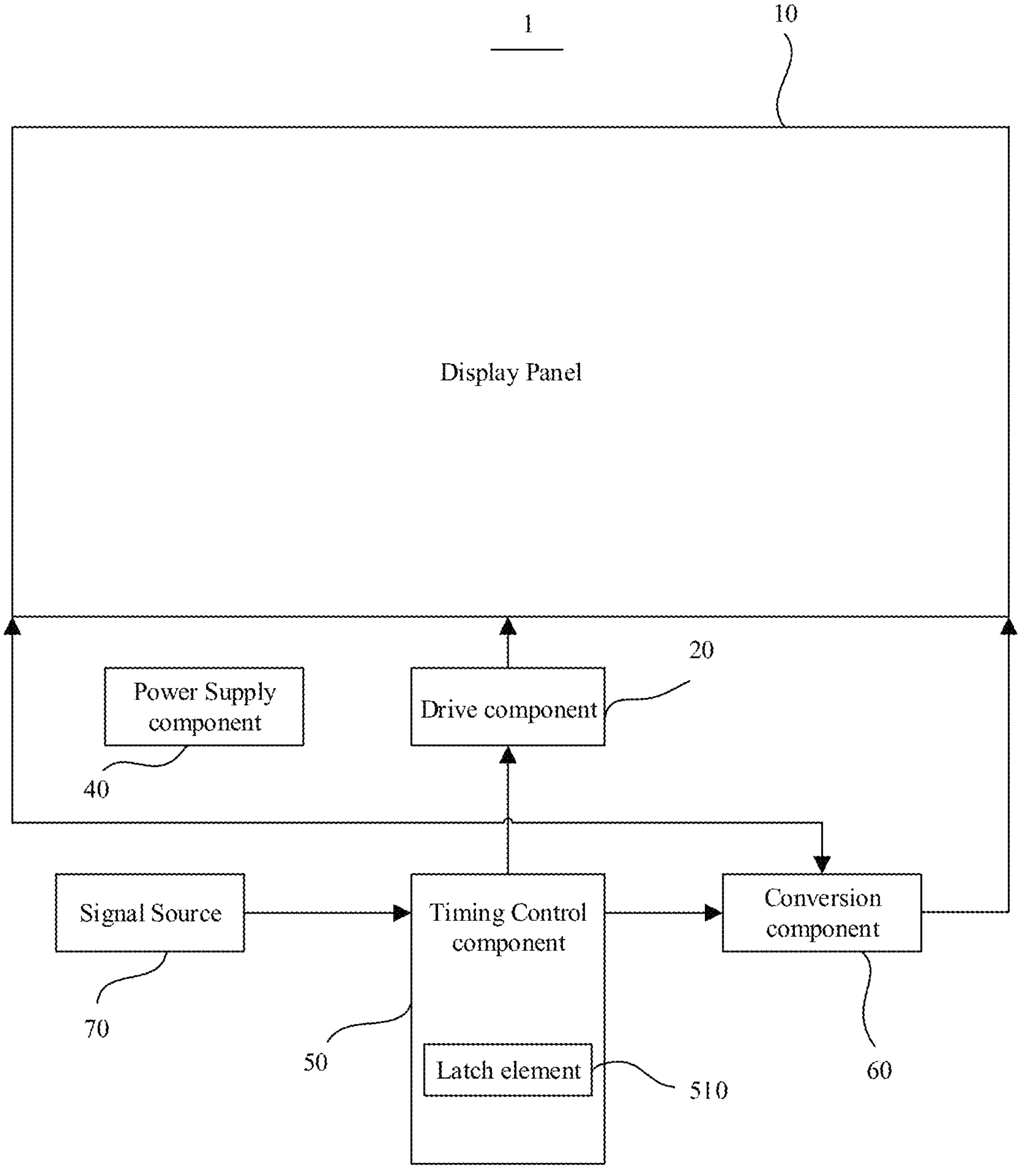
FIG. 12 is a structural schematic diagram of a display device in a third embodiment of the present application.

As shown in FIG. 12, the present application further provides a display device 1 including a display panel 10 and the display driving structure as described above. The display panel 10 has a display area and a non-display area, the non-display area is enclosed in the display area, the sub-pixels 110 are arranged the display area, and the switching component 30 is arranged in the non-display area to reduce the blocking of light in the display area. A signal source 70 inputs a display signal, and then the display signal is output to the timing control component 50.

Although the present application has been described with reference to several exemplary embodiments, it should be understood that the terms used are illustrative and exemplary, and are not restrictive. Since the present application may be embodied in various forms without departing from the spirit or essence of the present application, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A display driving structure, configured to drive a display panel comprising at least one pixel group, wherein the at least one pixel group comprises N rows and M columns of sub-pixels, N scan lines and M data lines, an m-th column of the sub-pixels in the at least one pixel group is all connected to an m-th data line, and at least part of the sub-pixels in an n-th row in the at least one pixel group are connected to an n-th scan line, where 1≤n≤N, 1≤m≤M, and N≥3;

wherein the display driving structure comprises:

a drive component connected to data lines in the at least one pixel group, wherein the drive component provides a one-to-one corresponding data signal to each of the sub-pixels through the data lines; and at least one switching component that is in one-to-one correspondence with the at least one pixel group, wherein the at least one switching component has a control terminal, a first input terminal, a second input terminal, a first output terminal and a second output terminal, wherein the first input terminal is configured to receive a p-th row of scanning signals, the second input terminal is configured to receive a (p+1)-th row of scanning signals, wherein the (p+1)-th row of the scanning signals is output after the p-th row of the scanning signals; wherein the first output terminal is connected to a p-th row of scan lines in the at least one pixel group, and the second output terminal is connected to a (p+1)-th row of scan lines in the at least one pixel group, where 1≤p<N;

wherein the control terminal of the at least one switching component is configured to control conduction of the first input terminal and the second output terminal, and control conduction of the second input terminal and the first output terminal when data signals received by adjacent two sub-pixels connected to each column of the data lines are different in polarity, wherein a write time of a data signal of a sub-pixel connected to the (p+1)-th row of the scan lines is prior to that of a data signal of a sub-pixel connected to the p-th row of the scan lines; and wherein the control terminal of the at least one switching component is further configured to control conduction of the first input terminal and the first output terminal, and control conduction of the second input terminal and the second output terminal when data signals received by adjacent two sub-pixels connected to each column of the data lines are same in polarity, wherein a write time of the data signal of the sub-pixel connected to the p-th row of the scan lines is prior to that of the data signal of the sub-pixel connected to the (p+1)-th row of the scan lines.

2. The display driving structure according to claim 1, wherein the at least one switching component comprises a first response switch and a third response switch, wherein an input terminal of the first response switch is connected to the first input terminal, and an output terminal of the first response switch is connected to the first output terminal; wherein, an input terminal of the third response switch is connected to the first input terminal, and an output terminal of the third response switch is connected to the second output terminal;

wherein the at least one switching component further includes a second response switch and a fourth response switch, wherein an input terminal of the second response switch is connected to the second input terminal, and an output terminal of the second response switch is connected to the second output terminal; wherein an input terminal of the fourth response switch is connected to the second input terminal, and an output terminal of the fourth response switch is connected to the first output terminal; and wherein the control terminal of the first response switch is connected to a first signal line, the control terminal of the second response switch is connected to a second signal line, the control terminal of the third response switch is connected to a third signal line, and the control terminal of the fourth response switch is connected to a fourth signal line.

3. The display driving structure according to claim 2, wherein the first signal line and the second signal line are connected to a same circuit, and the third signal line and the fourth signal line are connected to a same circuit, wherein the first response switch, the second response switch, the third response switch and the fourth response switch are response switches of a same type.

4. The display driving structure according to claim 2, wherein the first response switch and the second response switch are response switches of a same type, the third response switch and the fourth response switch are response switches of a same type, and the first response switch and the third response switch are of different types, wherein the first signal line, the second signal line, the third signal line and the fourth signal line are connected to a same circuit.

5. The display driving structure according to claim 1, wherein each pixel group of the at least one pixel group comprises four sub-pixels, the four sub-pixels are all connected to a same data line, and the p-th row of the scan lines and the (p+1)-th row of the scan lines are scan lines corresponding to any two adjacent sub-pixels.

6. The display driving structure according to claim 1, wherein the display driving structure comprises:

a power supply component connected to the drive component, wherein the power supply component is configured to detect a load current change of the drive component and to feed back a detection result; wherein a load current of the drive component is changed when the polarities of adjacent data signals on a data line are reversed;

a timing control component connected to the power supply component and the drive component respectively, wherein the timing control component is configured to receive the detection result fed back by the power supply component, and to adjust a sequence of the write time of the data signal of the sub-pixel connected to the p-th row of the scan lines and the write time of the data signal of the sub-pixel connected to the (p+1)-th row of the scan lines according to the detection result; and a conversion component connected to the timing control component and the at least one switching component, wherein the conversion component is configured to provide the p-th row of the scanning signals and the (p+1)-th row of the scanning signals; and the conversion component is further configured to send a switching instruction or a maintenance instruction to the control terminal of the at least one switching component; wherein the at least one switching component is configured to control conduction of the first input terminal and the second output terminal, and control conduction of the second input terminal and the first output terminal according to the switching instruction; or wherein the at least one switching component is configured to control conduction of the first input terminal and the first output terminal, and control conduction of the second input terminal and the second output terminal according to the maintenance instruction.

7. The display driving structure according to claim 6, wherein the timing control component comprises a latch element;

wherein when the data signals received by two adjacent sub-pixels are different in polarity, the latch element is configured to store the data signal of the sub-pixel connected to the p-th row of the scan lines, so as to first write the data signal of the sub-pixel connected to the (p+1)-th row of the scan lines and then write the data signal of the sub-pixel connected to the p-th row of the scan lines.

8. A display driving method, wherein the display driving method is applied to a display driving structure which is configured to drive a display panel, wherein the display panel comprising at least one pixel group, and the at least one pixel group comprises N rows and M columns of sub-pixels, N scan lines and M data lines, wherein an m-th column of the sub-pixels in the at least one pixel group is all connected to an m-th data line, and at least part of the sub-pixels in an n-th row in the at least one pixel group is connected to an n-th scan line, where $1 \leq n \leq N$, $1 \leq m \leq M$, and $N \geq 3$;

wherein the display driving structure comprises a drive component and at least one switching component, wherein the drive component is connected to data lines in the at least one pixel group to provide a one-to-one corresponding data signal to each of the sub-pixels through the data lines; wherein the at least one switching component is in one-to-one correspondence with the at least one pixel group, and the at least one switching component has a control terminal, a first input terminal, a second input terminal, a first output terminal and a second output terminal, wherein the first input terminal is configured to receive a p-th row of scanning signals, the second input terminal is configured to receive a (p+1)-th row of scanning signals, wherein the (p+1)-th row of the scanning signals is output after the p-th row of the scanning signals; wherein the first output terminal is connected to a p-th row of scan lines in the at least one pixel group, and the second output terminal is connected to a (p+1)-th row of scan lines in the at least one pixel group, where $1 \leq p < N$;

wherein the display driving method comprises:

acquiring a polarity reversal situation of data signals on the data lines in a same column, generating a switching instruction when the data signals received by adjacent two sub-pixels connected to each column of the data lines are different in polarity, and generating a maintenance instruction when the data signals received by adjacent two sub-pixels connected to each column of the data lines are same in polarity;

according to the switching instruction, controlling conduction of the first input terminal and the second output terminal and controlling conduction of the second input terminal and the first output terminal, at this time, a write time of a data signal of a sub-pixel connected to the (p+1)-th row of the scan lines is prior to that of a data signal of a sub-pixel connected to the p-th row of the scan lines; and according to the maintenance instruction, controlling conduction of the first input terminal and the first output terminal, and controlling conduction of the second input terminal and the second output terminal when the data signals received by adjacent two sub-pixels connected to each column of the data lines are same in polarity, wherein a write time of the data signal of the sub-pixel connected to the p-th row of the scan lines is prior to that of the data signal of the sub-pixel connected to the (p+1)-th row of the scan lines.

9. The display driving method according to claim 8, wherein generating the switching instruction when the data signals received by adjacent two sub-pixels connected to each column of the data lines are different in polarity comprises:

comparing a load current of the drive component with a preset current when the data signals received by adjacent two sub-pixels connected to each column of the data lines are different in polarity, and generating the switching instruction when the load current is greater than or equal to the preset current.

10. The display driving method according to claim 8, wherein generating the maintenance instruction when the data signals received by adjacent two sub-pixels connected to each column of the data lines are same in polarity comprises:

comparing a load current of the drive component with a preset current when the data signals received by adjacent two sub-pixels connected to each column of the data lines are same in polarity, and generating the maintenance instruction when the load current is less than the preset current.

11. A display device, comprising a display panel and a display driving structure, wherein the display driving structure is configured to drive the display panel, wherein at least one pixel group comprises N rows and M columns of sub-pixels, N scan lines and M data lines, an m-th column of the sub-pixels in the at least one pixel group is all connected to an m-th data line, and at least part of the sub-pixels in an n-th row in the at least one pixel group are connected to an n-th scan line, where $1 \leq m \leq N$, $1 \leq m \leq M$, and $N \geq 3$;

wherein the display driving structure comprises:

a drive component connected to data lines in the at least one pixel group, wherein the drive component provides a one-to-one corresponding data signal to each of the sub-pixels through the data lines; and at least one switching component that is in one-to-one correspondence with the at least one pixel group, wherein the at least one switching component has a control terminal, a first input terminal, a second input terminal, a first output terminal and a second output terminal, wherein the first input terminal is configured to receive a p-th row of scanning signals, the second input terminal is configured to receive a (p+1)-th row of scanning signals, wherein the (p+1)-th row of the scanning signals is output after the p-th row of the scanning signals; wherein the first output terminal is connected to a p-th row of scan lines in the at least one pixel group, and the second output terminal is connected to a (p+1)-th row of scan lines in the at least one pixel group, where $1 \leq p < N$;

wherein the control terminal of the at least one switching component is configured to control conduction of the first input terminal and the second output terminal, and control conduction of the second input terminal and the first output terminal when data signals received by adjacent two sub-pixels connected to each column of the data lines are different in polarity, wherein a write time of a data signal of a sub-pixel connected to the (p+1)-th row of the scan lines is prior to that of a data signal of a sub-pixel connected to the p-th row of the scan lines; and wherein the control terminal of the at least one switching component is further configured to control conduction of the first input terminal and the first output terminal, and control conduction of the second input terminal and the second output terminal when data signals received by adjacent two sub-pixels connected to each column of the data lines are same in polarity, wherein a write time of the data signal of the sub-pixel connected to the p-th row of the scan lines is prior to that of the data signal of the sub-pixel connected to the (p+1)-th row of the scan lines.

12. The display device according to claim 11, wherein the at least one switching component comprises a first response switch and a third response switch, wherein an input terminal of the first response switch is connected to the first input terminal, and an output terminal of the first response switch is connected to the first output terminal; wherein, an input terminal of the third response switch is connected to the first input terminal, and an output terminal of the third response switch is connected to the second output terminal;

wherein the at least one switching component further includes a second response switch and a fourth response switch, wherein an input terminal of the second response switch is connected to the second input terminal, and an output terminal of the second response switch is connected to the second output terminal; wherein an input terminal of the fourth response switch is connected to the second input terminal, and an output terminal of the fourth response switch is connected to the first output terminal; and wherein the control terminal of the first response switch is connected to a first signal line, the control terminal of the second response switch is connected to a second signal line, the control terminal of the third response switch is connected to a third signal line, and the control terminal of the fourth response switch is connected to a fourth signal line.

13. The display device according to claim 12, wherein the first signal line and the second signal line are connected to a same circuit, and the third signal line and the fourth signal line are connected to a same circuit, wherein the first response switch, the second response switch, the third response switch and the fourth response switch are response switches of a same type.

14. The display device according to claim 12, wherein the first response switch and the second response switch are response switches of a same type, the third response switch and the fourth response switch are response switches of a same type, and the first response switch and the third response switch are of different types, wherein the first signal line, the second signal line, the third signal line and the fourth signal line are connected to a same circuit.

15. The display device according to claim 11, wherein each pixel group of the at least one pixel group comprises four sub-pixels, the four sub-pixels are all connected to a same data line, and the p-th row of the scan lines and the (p+1)-th row of the scan lines are scan lines corresponding to any two adjacent sub-pixels.

16. The display device according to claim 11, wherein the display driving structure comprises:

a power supply component connected to the drive component, wherein the power supply component is configured to detect a load current change of the drive component and to feed back a detection result; wherein a load current of the drive component is changed when the polarities of adjacent data signals on a data line are reversed;

a timing control component connected to the power supply component and the drive component respectively, wherein the timing control component is configured to receive the detection result fed back by the power supply component, and to adjust a sequence of the write time of the data signal of a sub-pixel connected to the p-th row of the scan lines and the write time of the data signal of a sub-pixel connected to the (p+1)-th row of the scan lines according to the detection result; and a conversion component connected to the timing control component and the at least one switching component, wherein the conversion component is configured to provide the p-th row of the scanning signals and the (p+1)-th row of the scanning signals; and the conversion component is further configured to send a switching instruction or a maintenance instruction to the control terminal of the at least one switching component; wherein the at least one switching component is configured to control conduction of the first input terminal and the second output terminal, and control conduction of the second input terminal and the first output terminal according to the switching instruction; or wherein the at least one switching component is configured to control conduction of the first input terminal and the first output terminal, and control conduction of the second input terminal and the second output terminal according to the maintenance instruction.

17. The display device according to claim 16, wherein the timing control component comprises a latch element;

wherein when the data signals received by two adjacent sub-pixels are different in polarity, the latch element is configured to store the data signal of the sub-pixel connected to the p-th row of the scan lines, so as to first write the data signal of the sub-pixel connected to the (p+1)-th row of the scan lines and then write the data signal of the sub-pixel connected to the p-th row of the scan lines.

18. The display device according to claim 11, wherein the display panel has a display area and a non-display area, the non-display area is enclosed in the display area, wherein the sub-pixels are arranged in the display area, and the at least one switching component is arranged in the non-display area.

* * * * *